(12) United States Patent
Chen et al.

(10) Patent No.: US 12,505,611 B2
(45) Date of Patent: Dec. 23, 2025

(54) INTERACTIVE WEARABLE ELECTRONIC DEVICE WITH FACIAL EXPRESSION AND FACE RECOGNITION AND PROMPTING FUNCTIONS AND PROCESSING METHOD FOR INTERACTIVE WEARABLE ELECTRONIC DEVICE

(71) Applicant: NATIONAL DONG HWA UNIVERSITY, Hualien (TW)

(72) Inventors: Jen-Yeu Chen, Hualien County (TW); Chieh-Ming Yang, Hualien County (TW); Firdaus Golam, Hualien County (TW)

(73) Assignee: NATIONAL DONG HWA UNIVERSITY, Hualien (TW)

( * ) Notice: Subject to any disclaimer, the term of this patent is extended or adjusted under 35 U.S.C. 154(b) by 145 days.

(21) Appl. No.: 18/518,527

(22) Filed: Nov. 23, 2023

(65) Prior Publication Data
US 2024/0177406 A1 May 30, 2024

(30) Foreign Application Priority Data
Nov. 25, 2022 (TW) .................... 111145110

(51) Int. Cl.
*G06V 30/10* (2022.01)
*G02B 27/01* (2006.01)
(Continued)

(52) U.S. Cl.
CPC ........ *G06T 15/205* (2013.01); *G02B 27/0101* (2013.01); *G02B 27/017* (2013.01);
(Continued)

(58) Field of Classification Search
CPC .................. G06T 15/205; G02B 27/0101; G02B 27/017; G02B 2027/0138;
(Continued)

(56) References Cited

U.S. PATENT DOCUMENTS 10,523,991 B2 12/2019 Wexler et al.
2017/0206697 A1\* 7/2017 McKenzie ............ G06T 13/205
(Continued)

FOREIGN PATENT DOCUMENTS

| CN | 109154979 A | 1/2019 |
| CN | 109394247 B | 5/2021 |
| CN | 109475294 B | 8/2022 |
| TW | M643208 U | 7/2023 |

*Primary Examiner* — Jitesh Patel
(74) *Attorney, Agent, or Firm* — Li & Cai Intellectual Property (USA) Office

(57) ABSTRACT

An interactive wearable electronic device with facial expression and face recognition and prompting functions and a processing method for the interactive wearable electronic device are provided. The interactive wearable electronic device includes a controller, an image capture device and a display device. The controller detects whether there is a character image among a plurality of captured images. When the plurality of captured images include the character image, the controller performs a face recognition process on the character image to generate a character recognition text. When the plurality of captured images include the character image, the controller performs an emotion recognition process on the character image to provide an emotion image corresponding to the character image.

8 Claims, 14 Drawing Sheets

(51) Int. Cl.
  *G06T 15/20* (2011.01)
  *G06V 10/82* (2022.01)
  *G06V 20/20* (2022.01)
  *G06V 40/16* (2022.01)

(52) U.S. Cl.
  CPC .............. *G06V 10/82* (2022.01); *G06V 20/20* (2022.01); *G06V 30/10* (2022.01); *G06V 40/172* (2022.01); *G06V 40/174* (2022.01); *G02B 2027/0138* (2013.01); *G02B 2027/014* (2013.01)

(58) Field of Classification Search
  CPC .. G02B 2027/014; G06V 10/82; G06V 20/20; G06V 30/10; G06V 40/172; G06V 40/174; G06V 40/166; G06V 10/454; G06N 3/0464
  See application file for complete search history.

(56) References Cited

U.S. PATENT DOCUMENTS

| | | | |
|---|---|---|---|
| 2018/0190322 A1* | 7/2018 | Zukerman | G06V 10/95 |
| 2021/0073526 A1* | 3/2021 | Zeng | G06V 20/41 |
| 2023/0363680 A1* | 11/2023 | Shimizu | G06V 40/172 |
| 2023/0410378 A1* | 12/2023 | Karmi | G06V 40/174 |
| 2025/0087021 A1* | 3/2025 | Nakade | G06V 40/174 |

\* cited by examiner (happy image)

(fear image)

(neutral image)

(disgust image)

(surprise image)

(an angry image)

(sad image)

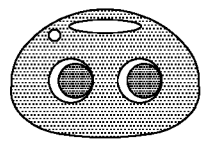 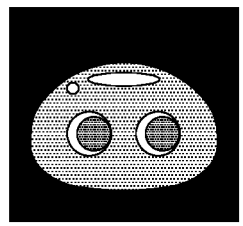 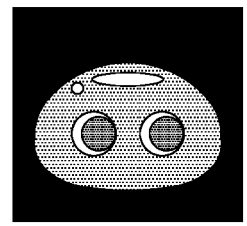 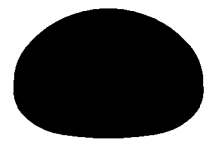
FIG. 6(A)　　FIG. 6(B)　　FIG. 6(C)　　FIG. 6(D)
 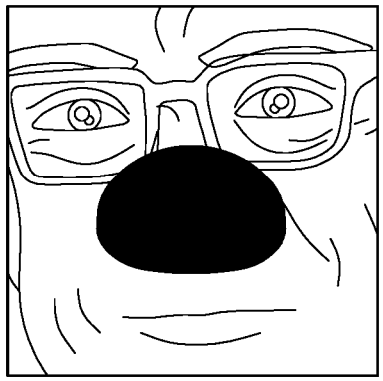 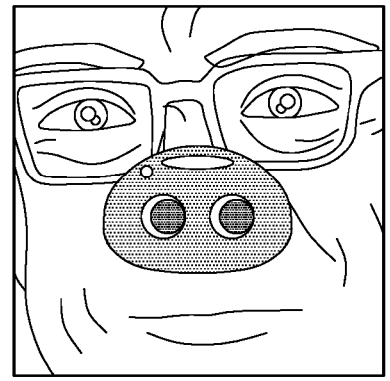
FIG. 6(E)　　FIG. 6(F)　　FIG. 6(G)

INTERACTIVE WEARABLE ELECTRONIC DEVICE WITH FACIAL EXPRESSION AND FACE RECOGNITION AND PROMPTING FUNCTIONS AND PROCESSING METHOD FOR INTERACTIVE WEARABLE ELECTRONIC DEVICE

CROSS-REFERENCE TO RELATED PATENT APPLICATION

This application claims the benefit of priority to Taiwan Patent Application No. 111145110, filed on Nov. 25, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wearable electronic device, and more particularly to, an interactive wearable electronic device.

BACKGROUND OF THE DISCLOSURE

Autistic children often lack the ability to recognize and express themselves socially, and are unable to integrate into group life, and the current common treatment methods are drug therapy and behavioral therapy. In behavioral therapy, therapists and special education teachers often use communication boards, communication pens and other assistive devices to slowly guide autistic children from willingness to speak to correct oral expression. However, the Augmentative and Alternative Communication (AAC) assistive devices are usually expensive and have less functional changes, and thus, therapists and special education teachers often use physical objects, communication cards, and phonetic versions instead of voice recorders, communication boards, and other high-tech AAC assistive devices as auxiliary tools to remind others of their emotional recognition.

The elderly is susceptible to dementia due to brain lesions or declining brain function caused by increasing age, often with memory loss, repetitively doing same things and asking same questions, and even forgetting the way home, the appearance and name of family members. Thus, the assistive devices for dementia usually have the functions of detecting and reminding, notifying and locating, which can assist in reminding people with faces to prevent forgetting people they know around them.

SUMMARY OF THE DISCLOSURE

The technical problem to be solved by the present disclosure is that for the inadequacies of the prior art, an intelligent assistive device is provided, suitable for being worn on a user, the intelligent assistive device includes a controller; an image capture device, electrically connected to the controller and configured to capture a plurality of captured images; and a display device, electrically connected to the controller and configured to display a plurality of augmented reality images to interact with the user; where the controller detects whether there is a character image among the plurality of captured images, and when the plurality of captured images include the character image, the controller performs a face recognition process on the character image for character recognition, to generate a character recognition text; and where the controller detects whether there is a character image among the plurality of captured images, and when the plurality of captured images include the character image, the controller performs an emotion recognition process on the character image, to provide an emotion image corresponding to the character image.

To solve the technical problem above, one of the technical solutions adopted by the present disclosure is to provide an intelligent assistive device interaction method, including the following steps: capturing a captured image, detecting whether there is a character image in the captured image, and if the captured image comprises the character image, performing a character image recognition process; performing a face recognition process on the character image for character recognition to generate a character recognition text; and performing an emotion recognition process on the character image to generate an emotion image corresponding to the character image.

One of the beneficial effects of the present disclosure is that the intelligent assistive device and the intelligent assistive device interaction method provided by the present disclosure can provide a simple and interesting emotion image and sticker image, so that the user can easily remember the characters seen.

Moreover, a corresponding character audio is provided, so that the user can quickly recall the relevant information of the character, to effectively assist the user in interacting with different characters.

In order to enable further understanding of the features and technical contents of the present disclosure, please refer to the following detailed description and drawings of the present disclosure. However, the drawings are only provided for reference and description, and are not intended to limit the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 6(A) to FIG. 6(G) are schematic diagrams of a sticking process by the artificial intelligence process according to the present disclosure;

DETAILED DESCRIPTION OF THE EXEMPLARY EMBODIMENTS

Figure 1:
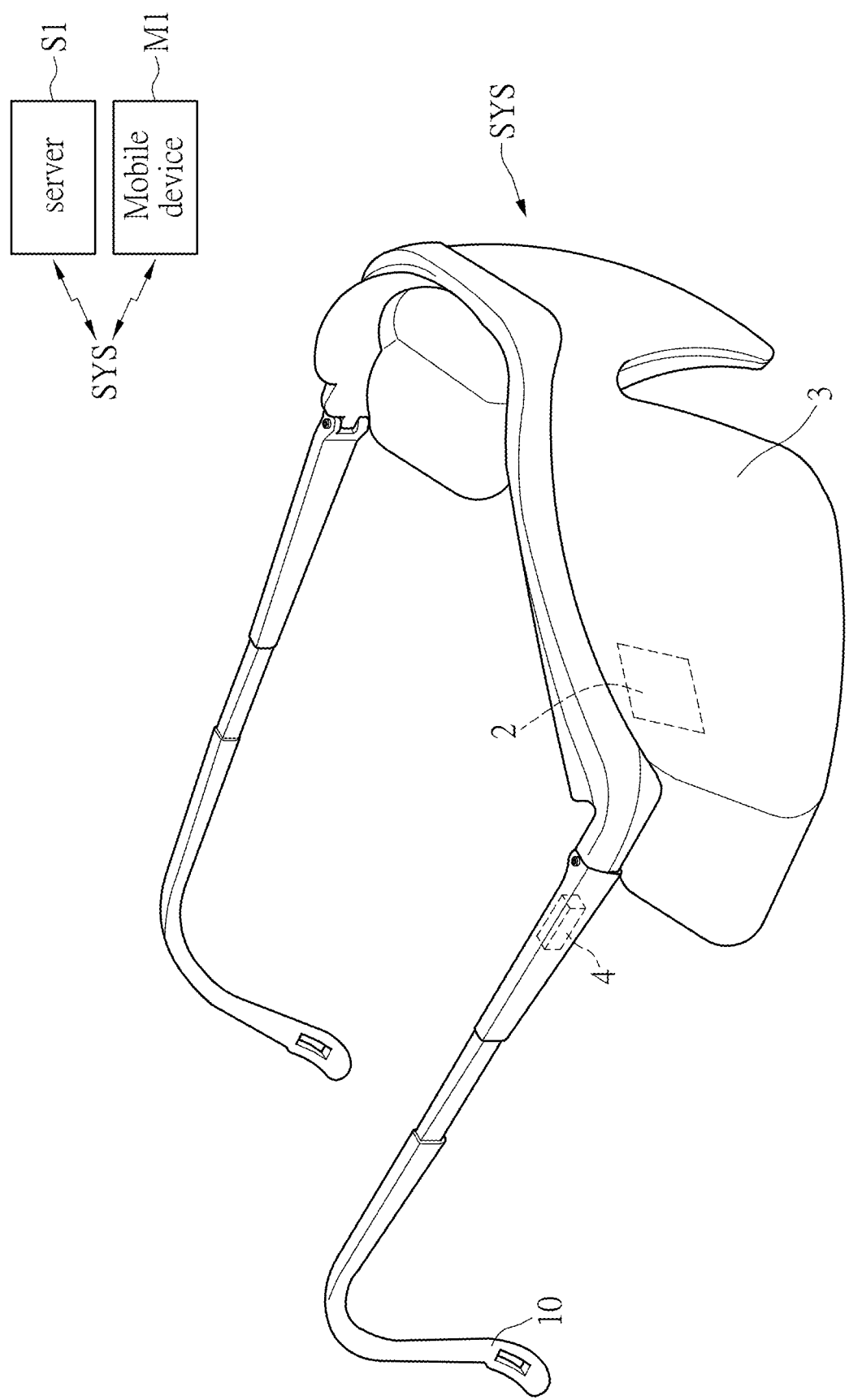
FIG. 1 is a schematic diagram of an interactive wearable electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The following illustrates embodiments of the present disclosure related to "an interactive wearable electronic device and an interactive wearable electronic device processing method" through specific embodiments, and those skilled in the art can understand the advantages and effects of the present disclosure from the disclosure of this specification. The present disclosure can be implemented or applied through other different specific embodiments, and various details in this specification can also be modified and changed based on different viewpoints and applications, without departing from the concept of the present disclosure. In addition, the drawings of the present disclosure are merely simple schematic descriptions, and are not drawn according to actual dimensions. The following implementations will further describe the related technical contents of the present disclosure in detail, but the contents provided are not intended to limit the protection scope of the present disclosure. In addition, the term "or" as used herein should, depending on actual situations, possibly include any one or more of the associated listed items.

First Embodiment

Figure 2A:
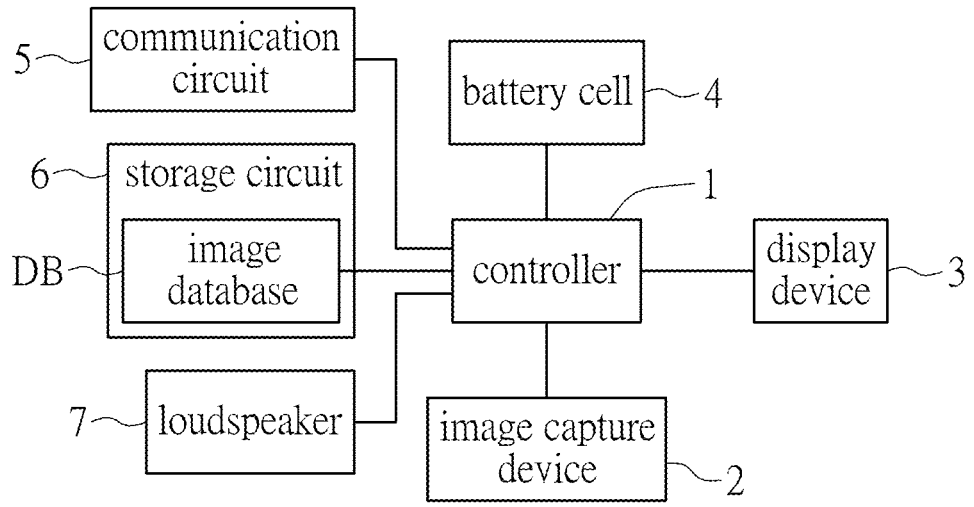
FIG. 2A and FIG. 2B are functional block diagrams of the interactive wearable electronic device according to the present disclosure, respectively.
Figure 2B:
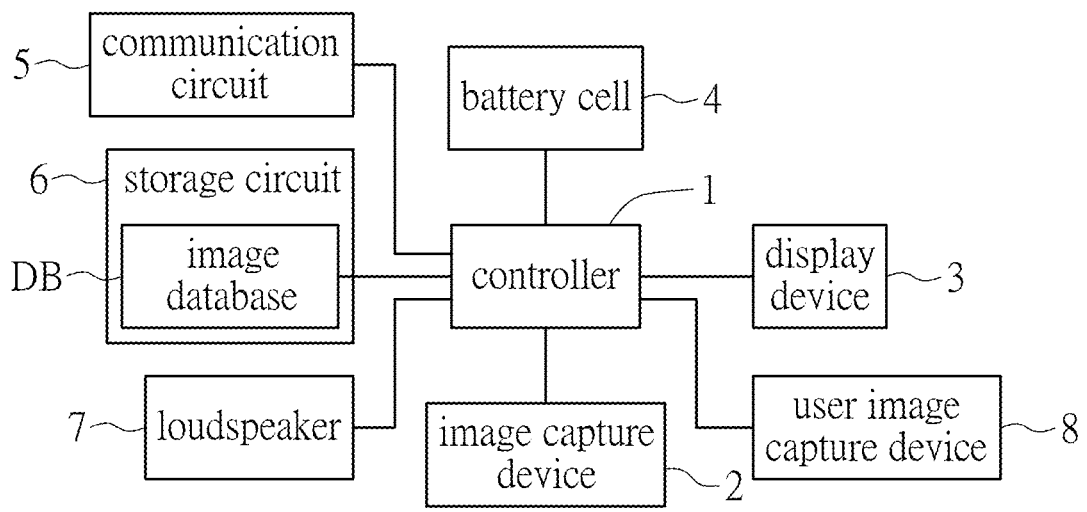

Referring to FIG. 1 and FIG. 2A, FIG. 1 is a schematic diagram of an interactive wearable electronic device of the first embodiment of the present disclosure. FIG. 2A and FIG. 2B are functional block diagrams of the interactive wearable electronic device according to the present disclosure, respectively.

In this embodiment, an interactive wearable electronic device SYS is provided, which is suitable for being worn on a user. The interactive wearable electronic device SYS includes a controller 1, an image capture device 2, a display device 3, a battery cell 4, a communication circuit 5, a storage circuit 6, and a loudspeaker 7.

The image capture device 2 is electrically connected to the controller 1. The image capture device 2 is configured to capture a plurality of captured images.

The display device 3 is electrically connected to the controller 1. The display device 3 is configured to display a plurality of augmented reality images to interact with the user.

The battery cell 4 is electrically connected to the controller 1. The communication circuit 5 is electrically connected to the controller 1. The storage circuit 6 is electrically connected to the controller 1.

In this embodiment, the display device 3 is a translucent display device or a transparent display device, so that the user can see the outside character and environment through the display device 3. In other embodiments, the display device 3 is a non-transparent display device, and an external image is captured or recorded by the image capture device 2 and is viewed by the user through the display device 3. In this embodiment, the image capture device 2, the display device 3, the battery cell 4, the communication circuit 5, the storage circuit 6 and the loudspeaker 7 are all arranged on an assistive device frame 10.

Figure 3:
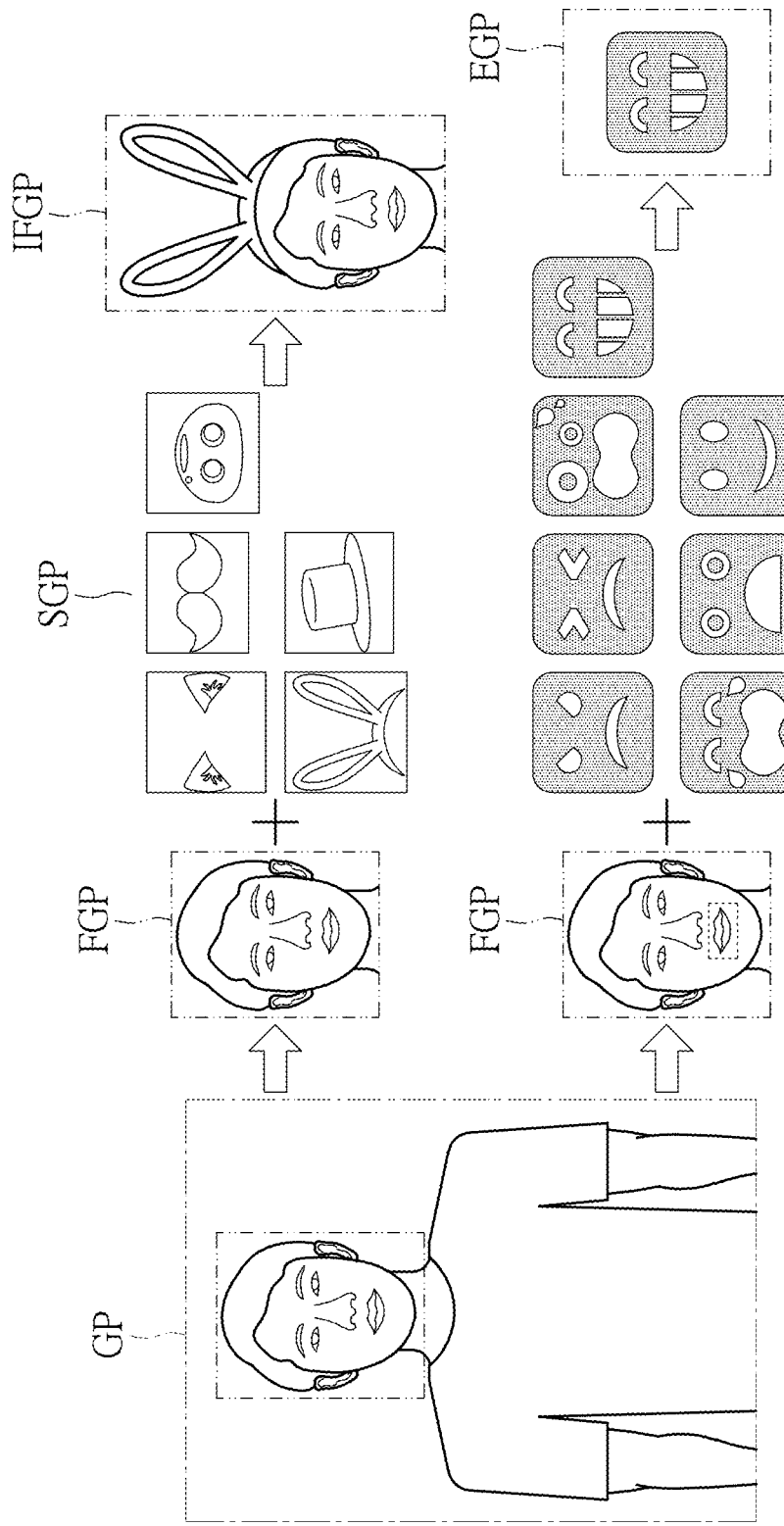
FIG. 3 is a schematic diagram of a plurality of recognition processes by the interactive wearable electronic device according to the first embodiment of the present disclosure.
Figure 4:
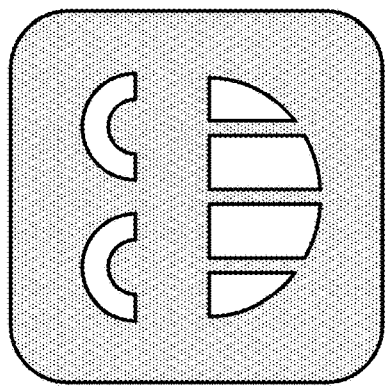
FIG. 4 is a schematic diagram of a plurality of emotion images of the interactive wearable electronic device according to the first embodiment of the present disclosure.
Figure 4:
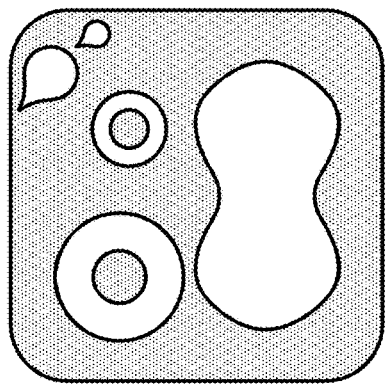
Figure 4:
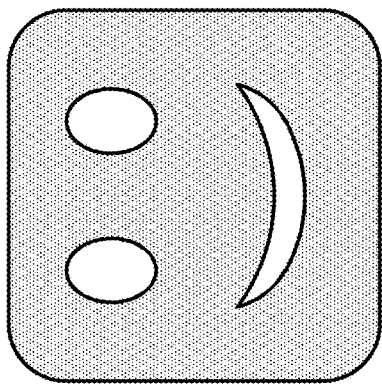
Figure 4:
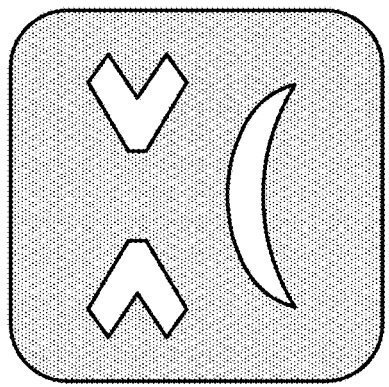
Figure 4:
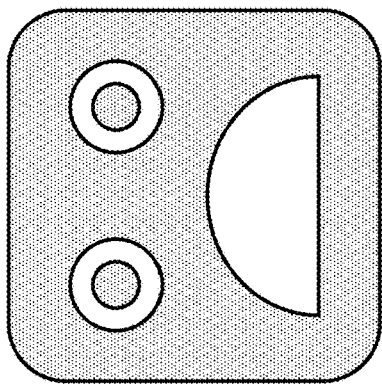
Figure 4:
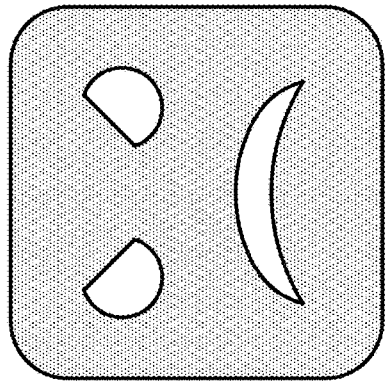
Figure 4:
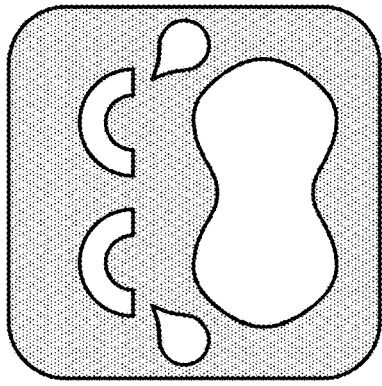
Figure 5:
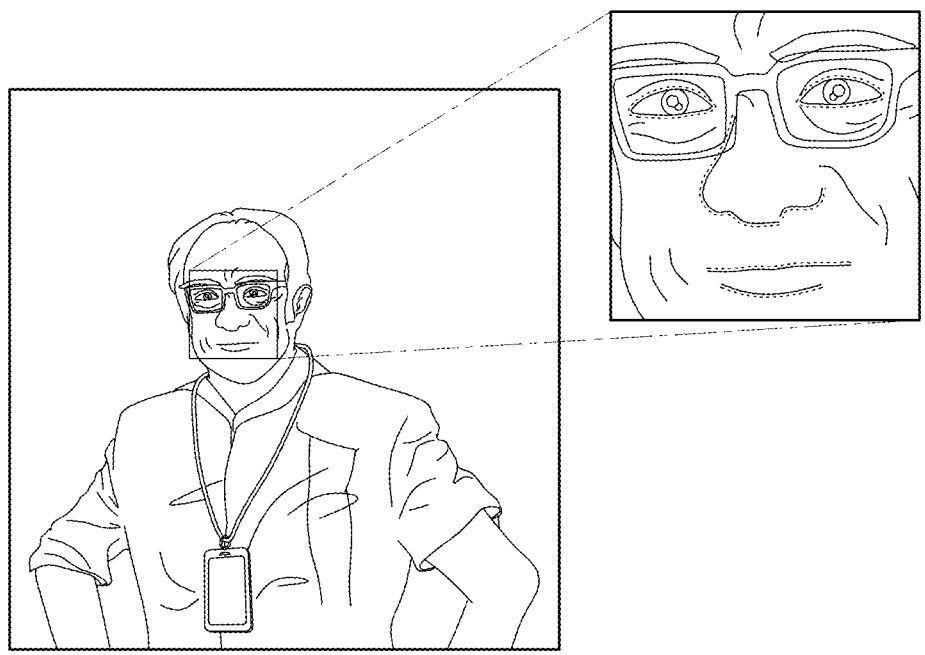
FIG. 5 is a schematic diagram of face recognition and face landmark processing by an artificial intelligence process according to the present disclosure.

First, referring to FIG. 3, FIG. 4 and FIG. 5, FIG. 3 is a schematic diagram of a plurality of recognition processes by the interactive wearable electronic device according to the first embodiment of the present disclosure. FIG. 4 is a schematic diagram of a plurality of emotion images EGP of the interactive wearable electronic device according to the first embodiment of the present disclosure. FIG. 5 is a schematic diagram of viewing of a user by wearing the interactive wearable electronic device.

The plurality of captured images captured by the image capture device 2 are transmitted to the controller 1 for analysis. The controller 1 detects whether there is a character image GP among the plurality of captured images. That is, as long as there is a character appears in a field of view of the display device 3, the controller 1 will perform a character image recognition process on the character image GP. In this embodiment, the interactive wearable electronic device SYS includes an artificial intelligence process. The controller 3 performs the character image recognition process through the artificial intelligence process. The artificial intelligence process of the interactive wearable electronic device SYS includes a machine learning program, and determines whether a character image GP is included in the captured image, and when the captured image includes one or more character images GP, performs image capturing on the character image GP and establishes a model for judgment and analysis. The artificial intelligence process of the controller 3 can capture facial line outlines of the character image GP for analysis, such as an eye line outline, a mouth line outline, and a cheek line outline. In this embodiment, the artificial intelligence process learns by the machine learning program to improve the accuracy of character recognition or emotion content recognition.

In addition, the machine learning program in the artificial intelligence process includes an artificial neural network algorithm, a decision tree algorithm, a perceptron algorithm, a support vector machine algorithm, an integrated learning algorithm (AdaBoost), a dimensionality reduction and metric learning algorithm, a clustering algorithm, a Bayesian classifier algorithm, a Gaussian process regression algorithm, a linear discriminant analysis algorithm, a nearest neighbor algorithm, a radial basis function algorithm, a Markov chain algorithm, a Monte Carlo algorithm, and a variational algorithm.

When the plurality of captured images include the character image GP, the controller 1 performs a face recognition process on the character image GP for character recognition to generate a character recognition text.

In this embodiment, the controller 1 deletes the character image GP into a face image FGP based on avatar.

The controller 1 performs a face recognition process on the character image GP, and recognizes whether the character is an acquaintance. That is, the controller 1 compares the character image GP with an acquaintance image in an image database DB.

In this embodiment, 128 feature values of a face of the character image GP are extracted and compared with 128 feature values of a face of the plurality of character images in the image database DB. When the calculated distance is less than a threshold, the character is determined as an acquaintance. In addition, the face recognition process in this embodiment performs calculation by using an algorithm of a face recognition model, such as Google's FaceNet.

When the character image GP is an acquaintance, a corresponding text, sticker and audio in the acquaintance image are integrated into the character image GP, to generate an integrated character image IFGP.

When the controller 1 determines that the character image is not an acquaintance, the text: "unknown person" or other texts is added next to the face image FGP after the deletion of the character image GP.

In addition, referring to FIG. 2B, in other embodiments, the interactive wearable electronic device SYS further includes a user image capture device 8 configured to capture a face image FGP of the user and perform an emotion recognition process to obtain emotion content information of the user. The controller 1 can analyze according to the emotion content, the character image GP, and the emotion image EGP of the user in a same time interval to generate an interactive state information. That is, the user image capture device 8 faces the user. In addition, the user image capture device 8 and the image capture device 2 can be disposed at the same position. Moreover, the user image capture device 8 and the image capture device 2 are both camera modules.

Referring to FIG. 3, in addition to performing the face recognition process on the character image GP, the controller 1 further provides a plurality of sticker images SGP to be provided on the face image FGP after the deletion of the character image GP.

The user can select one of the plurality of sticker images SGP to be provided on the character image GP, to form an integrated character image IFGP. In other embodiments, the sticker image SGP may be added or made by the user.

The controller 1 can provide, according to the character image GP, a character audio to be added into the integrated character image IFGP.

The plurality of sticker images SGP include an eye sticker image, an ear sticker image, a nose sticker image, a beard sticker image, or a body part image. In this embodiment, the sticker image SGP is mainly a relevant sticker image of the face or head.

In addition, the controller 1 may also perform an emotion recognition process on the character image GP. That is, the controller 1 analyzes a facial curve of the character image GP to analyze the emotion content of the character image GP and convert same into an emotion image EGP. In addition, in this embodiment, the emotion content of the character image GP may also have a percentage indicating a probability of an emotion, as shown in FIG. 5. In addition, the controller 1 periodically performs an emotion recognition process on the emotion content of the character image GP, so that the user can quickly grasp the changes of the emotion content of the character image GP.

That is, in addition to the face recognition process, the controller 1 also performs the emotion recognition process on the character image GP, and provides an emotion image EGP corresponding to the character image GP.

As shown in FIG. 4, the controller 1 can provide seven emotion images EGP, namely a happy image, an angry image, a disgust image, a fear image, a sad image, a surprise image, and a neutral image. In other embodiments, the controller 1 can provide other emotion images EGP, which is not limited in the present disclosure.

Referring to FIG. 5 and FIG. 6(A) to FIG. 6(G), in the education process of children with special neurodevelopmental disorders, difficult situations such as learning, social communication, emotion, and attention are often encountered. If image recognition technology and sticker technology are available, these can improve their attention and remind them. For the sticker image of this embodiment, sticking may be performed by selecting a specified character via the face recognition process, or sticking may be self-defined to select a favorite and eye-catching sticker.

As shown in FIG. 5, from a real-time image of the image capture device 2, a face recognition device is used to capture a position of a face region (block), and from an image of the region, a face feature device obtains face landmarks, such as eyes, nose, eyebrows, face outlines and other positions, and the sticking process described in the next paragraph is performed.

Referring to FIG. 6(A) to FIG. 6(G), first, a white background or colorless background of the sticker in FIG. 6(A) is converted into a black background (black back), as shown in FIG. 6(B). The sticker is then converted into a grayscale image (FIG. 6C). Then, a mask is established by binarizing the grayscale image, as shown in FIG. 6(D). These steps are preparation steps before sticking of the sticker.

Next, as shown in FIG. 6(E), pixels of an image of the nose region in the character image GP passing through the mask are used as a critical value, and if the masked pixels in this region are white, the pixels remain unchanged; on the contrary, if the masked pixels in this region are black, the sticker pixels become black, as shown in FIG. 6(F).

Then, pixels of the sticker of FIG. 6(B) (the background is black) are added to pixels of the image of FIG. 6(F) to obtain FIG. 6 (G) with successful sticking.

In addition, the specified position can be placed through the face landmarks, for example, a pig's nose is placed in the center of the nose, a hat is placed over the brow, etc., and the size and rotation angle of the sticker can be proofread by the European distance of the face landmarks.

Figure 7:
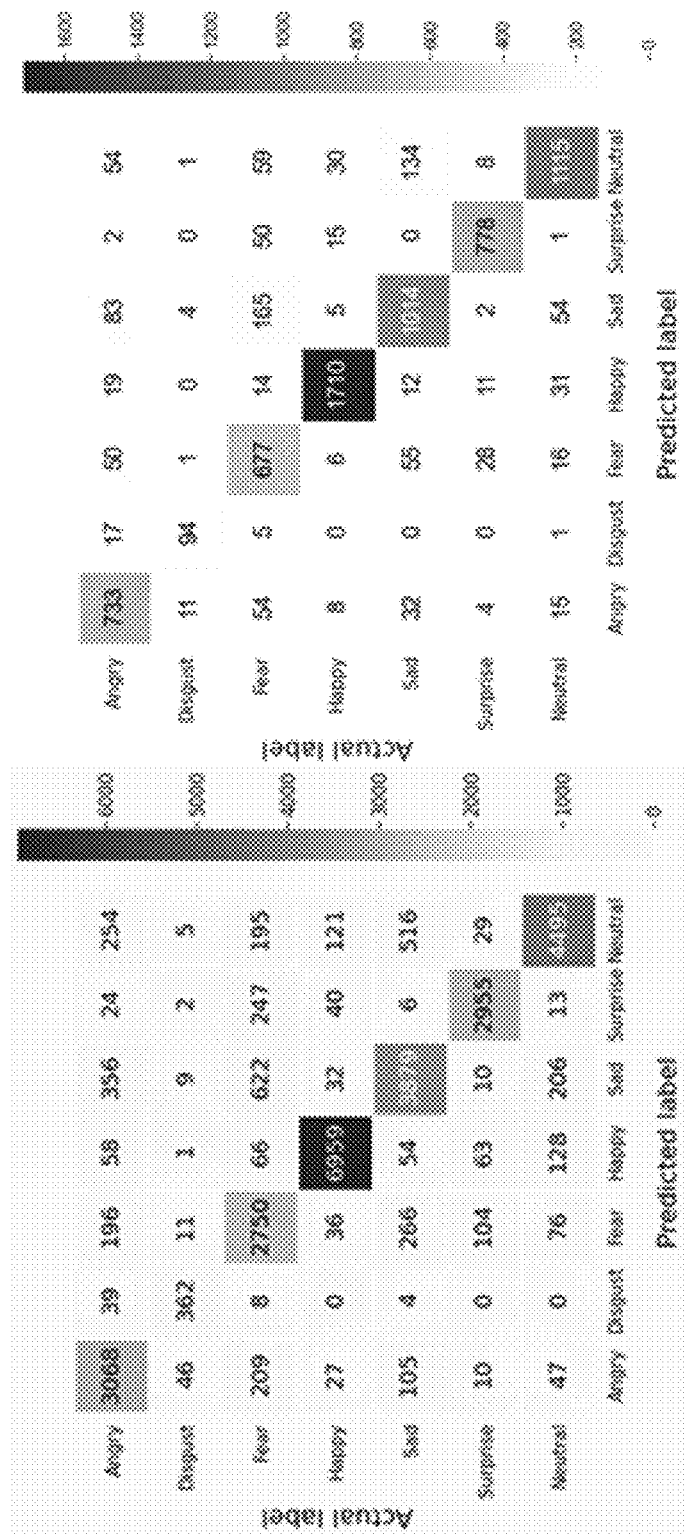
FIG. 7 is a schematic diagram of a training set and a test set for training by the artificial intelligence process according to the present disclosure.
Figure 8:
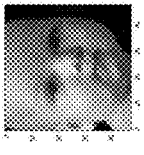
FIG. 8 is a schematic diagram of recognition of a variety of emotions by the artificial intelligence process according to the present disclosure.

Referring to FIG. 7 and FIG. 8, the emotion recognition process determines an emotion response of the face from the capture of small muscle action features of the face. In this embodiment, training is performed using grayscale images each with a size of 48×48, with 28,709 images in a training set and 7,178 images in a test set. In addition, an algorithm model used by the artificial intelligence (AI) process in this embodiment is trained on a convolutional neural network (CNN) architecture, and in the training process, the artificial intelligence process automatically learns to recognize a plurality of subtle features of seven emotion categories: angry, disgust, fear, happy, sad, surprise, and neutral for classification, and finally, the accuracy of the training set and the test set can reach 85.23% and 85.27%, respectively. As shown in a confusion matrix in FIG. 7, the horizontal axis is the actual label category and the vertical axis is the predicted category, and thus an oblique diagonal (top left to bottom right) is the number of correct classification for each category, and the higher the value, the more accurate it is.

Figure 9:
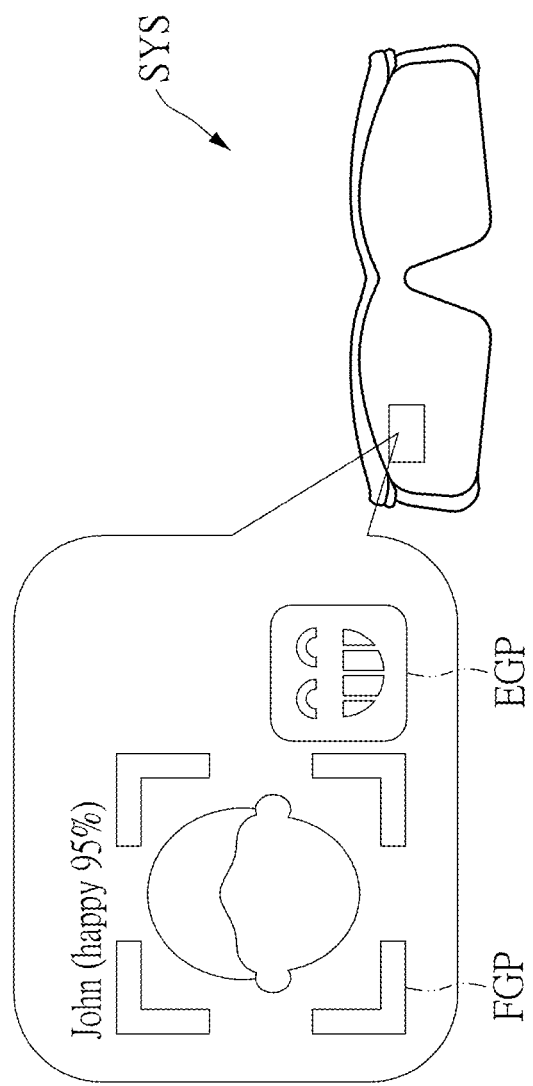
FIG. 9 is a schematic diagram of viewing of a user by wearing the interactive wearable electronic device.

In feature-based visualization, a region of interest of the convolutional neural network may be presented by using a heat map of Grad-CAM, a training model of the artificial intelligence process for emotion recognition in the present disclosure can capture corresponding emotional expression features, such as raising eyebrows when angry, frowning and nasolabial folds when disgusted, putting hands on face, opening mouth and screaming when feared, raising corners of the mouth and crow's feet next to the eyes when happy, tears in the eyes and face when sad, opening mouth wide when surprised, and normal expression features when neutral. As shown in FIG. 8, the region with shallow grayscale is a region of high concern of the training model of the artificial intelligence process, and the region with deep grayscale is a region of low concern of the training model of the artificial intelligence process. Referring to FIG. 9, the character recognition text, the character image GP, and the emotion image EGP are displayed on one side of the display device 3 or on the display device 3. The character recognition text is provided on one side of the character image GP or is displayed on the display device 3. In the figure, the character recognition text is provided above the character image GP.

In the figure, a single-character image GP is taken as an example. When the captured image includes a plurality of character images GP, the controller 1 can provide the plurality of character images GP and corresponding character recognition texts, which are displayed by the display device 3.

In addition, when the image includes multiple persons appearing at the same time, because facial expression stickers are covered on the faces in the case of many persons, in this embodiment, a variety of sticking positions are provided, and the sticking positions are determined by calculating an Intersection of Union (IoU) of the sticking positions and other face positions.

In this embodiment, the calculation formula for determining the sticking position is the intersection area of the sticker and other face regions divided by the union area. If the IoU value is zero, it is indicated that the sticker is not covered on other faces. If the IoU value is non-zero, one needs to change the sticking position or does not stick.

Figure 10:
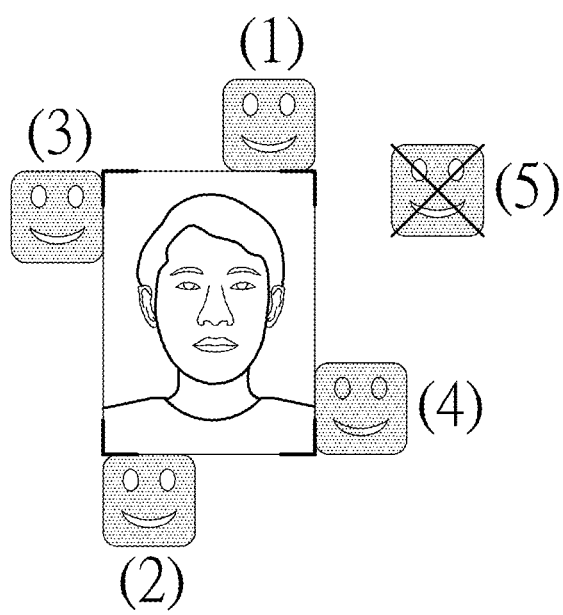
FIG. 10 is a schematic diagram of the priority order of sticking positions.

Referring to FIG. 10, the priority of the sticking positions is to select the upper right (1), lower left (2), lower right (3), upper left (4), and no sticking (5) in order.

Figure 12:
FIG. 12 is a schematic diagram of the results of sticking a plurality of images according to the first embodiment of the present disclosure.

The actual multi-character sticking results are as shown in FIG. 12. In addition, the user can also adjust the priority position voluntarily. In this embodiment, the interactive wearable electronic device SYS can enlarge the character image GP or the sticker to solve the defect of a small display of the wearable electronic device.

Figure 11:
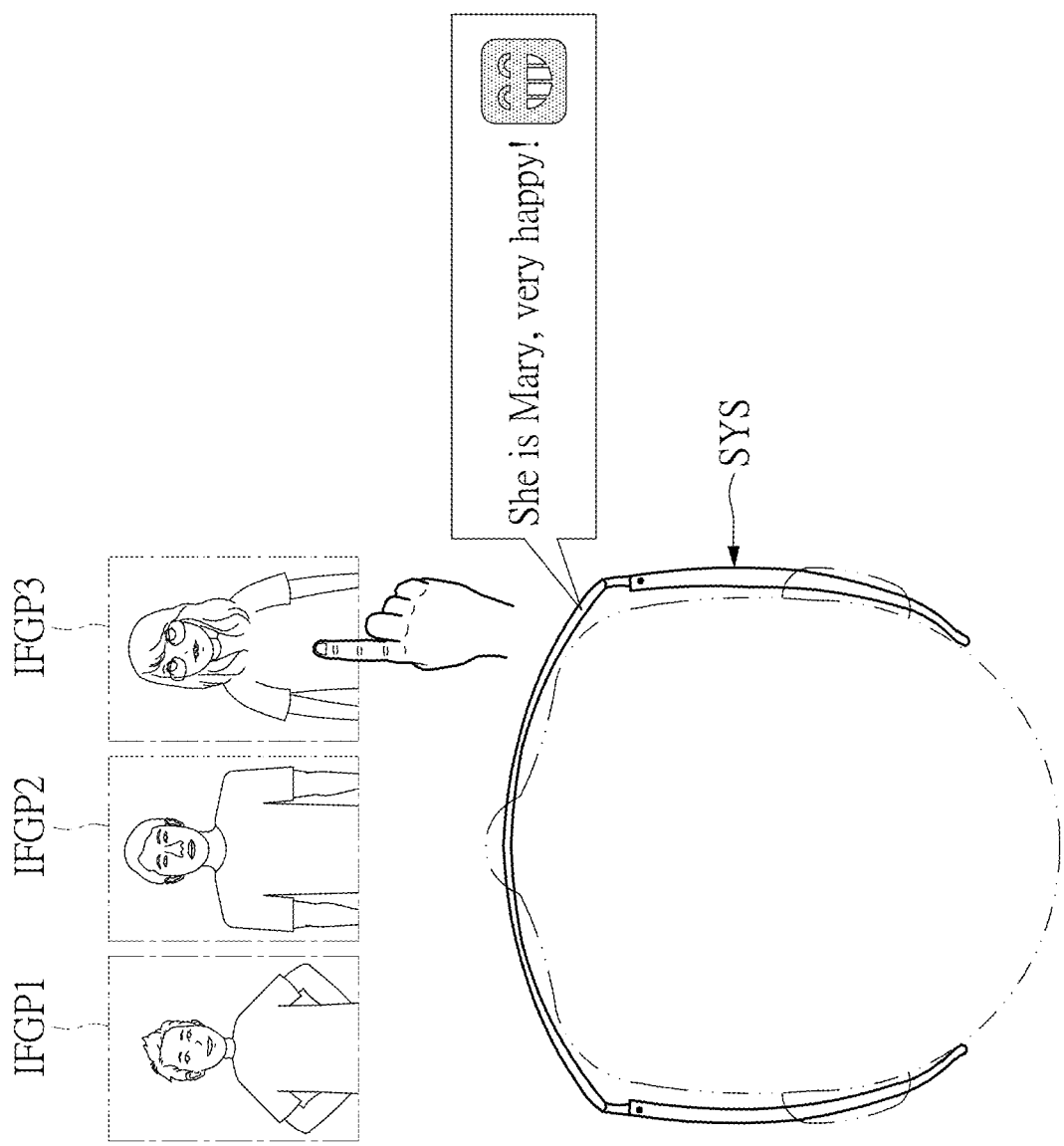
FIG. 11 is a schematic diagram of the user pressing a character image.

Moreover, as shown in FIG. 11, the user can use a hand part to point to the character image GP or the integrated character image IFGP1-IFGP3. The controller 1 plays the character audio or the integrated character audio through the loudspeaker 7 to notify the user. That is, when the user's hand part appears in the field of view of the display device 3, the image capture device 2 can capture the user's hand part and analyze the coordinates of the hand part, to press the integrated character image IFGP1-IFGP3 for interaction. The brightness or signal in playing the character audio may be changed for the integrated character image IFGP.

In this embodiment, the plurality of captured images, the character image GP, the face image FGP, the plurality of emotion images EGP, and a plurality of acquaintance images (not shown) are all stored in the image database DB in the storage circuit 6.

The controller 1 is a central processing unit (CPU), an application-specific integrated circuit (ASIC), a graphics processor (GPU) or a microprocessor (MCU). The storage circuit 6 is a flash memory, a read-only memory, a programmable read-only memory, an electrically rewritable read-only memory, an erasable and programmable read-only memory, or an electrically erasable and programmable read-only memory. The display device 3 can be a liquid crystal display device or an organic light-emitting diode display device.

The communication circuit 5 can be a wired communication unit or a wireless communication unit. When being a wired communication unit, the communication circuit 5 can be independently arranged to communicate with a server S1, to receive a control signal of the server S1 or data in a database of the server S1. When being a wireless communication unit, the communication circuit 5 can be a Wi-Fi communication unit, a Bluetooth communication unit, a purple bee communication unit (Zigbee), a LoRa communication unit, a Sigfox communication unit, or an NB-IoT communication unit. In this embodiment, the interactive wearable electronic device SYS can also be connected to a mobile device M1 through the communication circuit 5 to interact with a program of the mobile device M1. Video information of the interactive wearable electronic device SYS can also be uploaded to the mobile device M1 or the server S1. Similarly, the mobile device M1 or the server S1 can also be downloaded to the interactive wearable electronic device SYS via the communication circuit 5. The battery cell 4 is a lithium-ion battery, a lithium-manganese battery, a lithium-polymer battery, or a nickel-metal hydride battery, and is used to provide electric energy to components of the interactive wearable electronic device SYS. In this embodiment, the loudspeaker 7 is a bone conduction loudspeaker. In other embodiments, the loudspeaker 7 can be an in-ear loudspeaker, a semi-in-ear loudspeaker, or a full-hood loudspeaker.

In this embodiment, the interactive wearable electronic device SYS can provide the interactive state information of the user through the communication circuit 5 to the server S1 for analysis.

Second Embodiment

Figure 13:
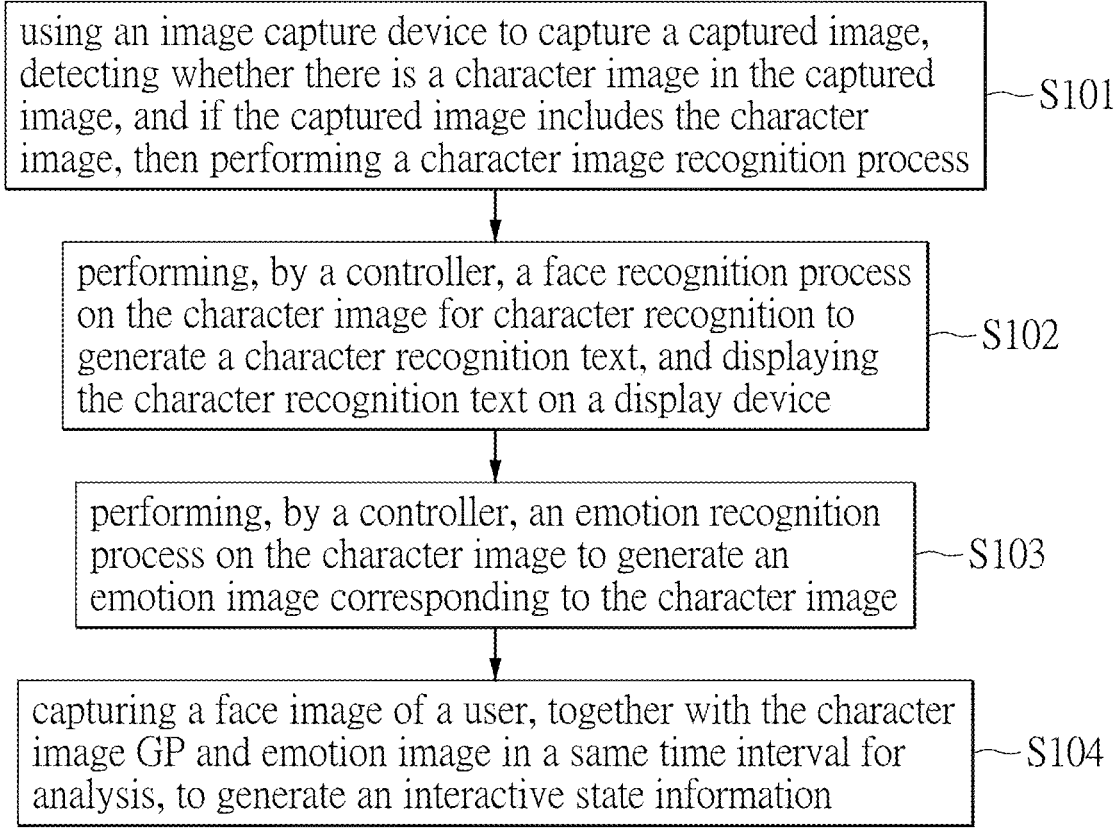
FIG. 13 is a flowchart of an interactive wearable electronic device interaction method according to a second embodiment of the present disclosure.

Referring to FIG. 13, FIG. 13 is a flowchart of an interactive wearable electronic device interaction method according to a second embodiment of the present disclosure.

In this embodiment, an interaction method for interacting through an interactive wearable electronic device is provided, which is suitable for the interactive wearable electronic device SYS of the first embodiment, the function and structure of which are not described herein.

The interaction method for interacting through the interactive wearable electronic device includes the following steps:

using an image capture device to capture a captured image, detecting whether there is a character image in the captured image, and if the captured image includes the character image, then performing a character image recognition process (step S101);

performing, by a controller, a face recognition process on the character image for character recognition to generate a character recognition text, and displaying the character recognition text on a display device (step S102);

performing, by a controller, an emotion recognition process on the character image to generate an emotion image corresponding to the character image (step S103), and displaying the emotion image on the display device; and capturing a face image of a user, together with the character image GP and emotion image in a same time interval for analysis, to generate an interactive state information (step 104).

Figure 14:
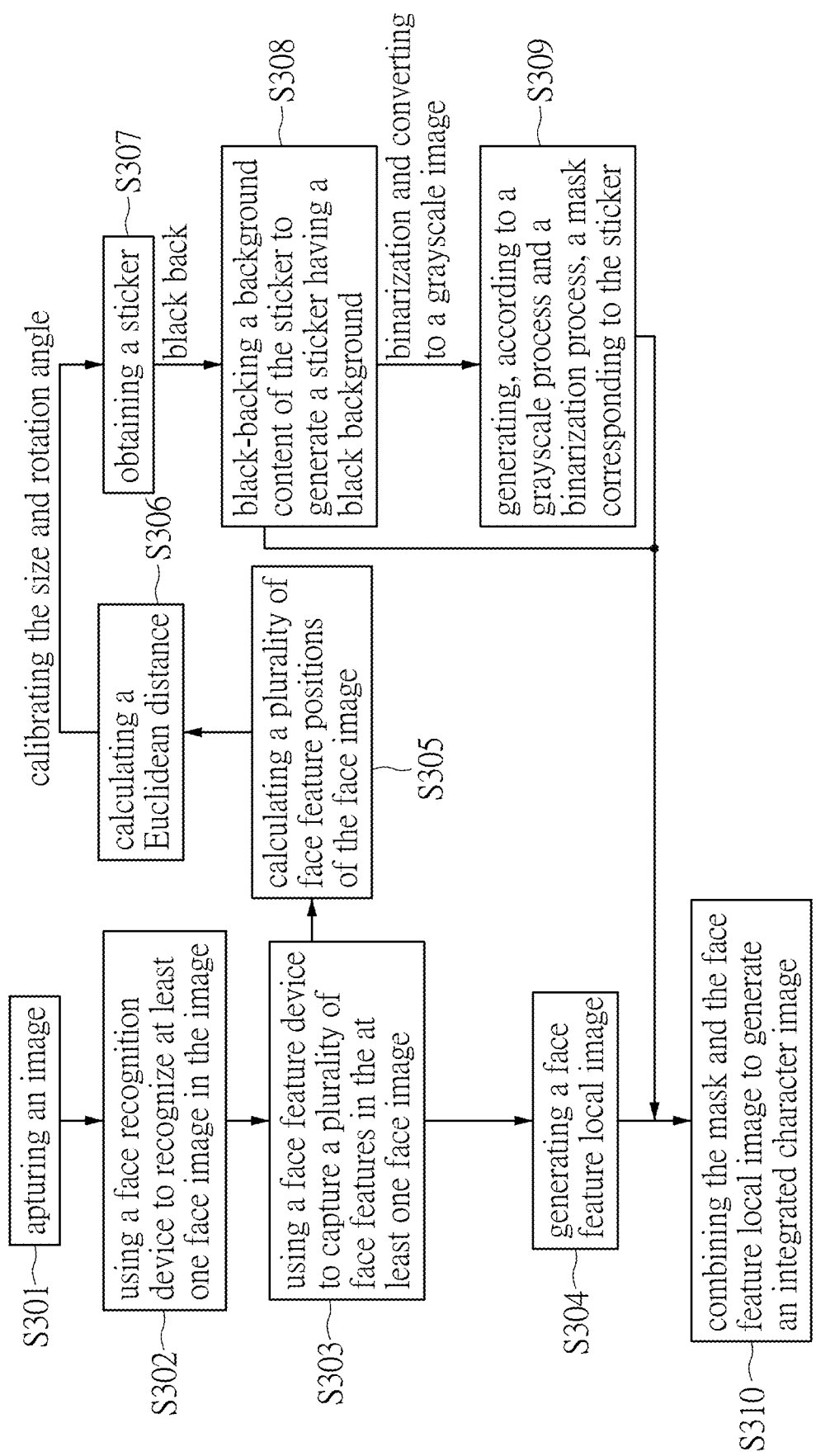
FIG. 14 is a flowchart of a processing method for sticking a character image according to the second embodiment of the present disclosure.

In addition, referring to FIG. 14, in this embodiment, a processing method for sticking on the character image is also provided, which includes the following steps:

capturing an image (step S301);

using a face recognition device to recognize at least one face image in the image (step S302);

using a face feature device to capture a plurality of face features in the at least one face image (step S303);

generating a face feature local image (step S304);

calculating a plurality of face feature positions of the face image (step S305);

calculating a Euclidean distance (step S306);

obtaining a sticker (step S307);

black-backing a background content of the sticker to generate a sticker having a black background (step S308);

generating, according to a grayscale process and a binarization process, a mask corresponding to the sticker (step S309); and combining the mask and the face feature local image to generate an integrated character image (step S310).

In step S301 to step S303, from an real-time image of the image capture device 2, the face recognition device is used to capture a position of a face region, and from the image of this region, the face feature device is further used to obtain the face landmarks, such as eyes, nose, eyebrows, face contour and other positions.

In step S304 to step S306, the face recognition device and the face feature device are used to perform face recognition and facial feature recognition on the character image in an image, to generate the face feature local image. In addition, in step S306, the Euclidean distance is calculated based on the face landmarks.

In step S307 to step S310, referring to FIG. 6(A) to FIG. 6(D), first the white background or colorless background of the sticker is converted into a black background (black back). The sticker is then converted to a grayscale image. Then, a mask is established by binarization of the grayscale image. Then, the sticker is placed in the specified position through the face landmarks, such as placing the pig's nose in the center of the nose, and placing the hat over the brows, and the size and rotation angle of the sticker are calibrated by the European distance of the face landmarks.

In step S309, pixels of an image of the nose region in the character image GP passing through the mask are used as a critical value, and if the masked pixels in this region are white, the pixels remain unchanged; on the contrary, if the masked pixels in this region are black, the sticker pixels become black, as shown in FIG. 6(F).

Then, pixels of the face feature local image is added to pixels of the black-backed sticker, to obtain the integrated character image, as shown in FIG. 6(G).

Beneficial Effects of the Embodiments

One of the beneficial effects of the present disclosure is that the interactive wearable electronic device and the interactive wearable electronic device interaction method provided by the present disclosure can provide a simple and interesting emotion image and sticker image, so that the user can easily remember the characters seen. Moreover, a corresponding character audio is provided, so that the user can quickly recall the relevant information of the character, to effectively assist the user in interacting with different characters.

The contents provided above are only preferred feasible embodiments of the present disclosure, and thus are not intended to limit the claims of the present disclosure. Therefore, any equivalent technical change made by using the specification and drawings of the present disclosure shall fall within the claims of patent disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interactive wearable electronic device, suitable for being worn on a user, wherein the interactive wearable electronic device comprises facial expression and face recognition and prompting functions, and the interactive wearable electronic device further comprises an artificial intelligence process, the interactive wearable electronic device comprising:

a controller;

an image capture device, electrically connected to the controller and configured to capture a plurality of captured images; and a display device, electrically connected to the controller and configured to display a plurality of augmented reality images to interact with the user;

wherein the controller detects whether there is a character image among the plurality of captured images through the artificial intelligence process, and when the plurality of captured images comprise the character image, the controller performs a face recognition process on the character image through the artificial intelligence process, to generate a character recognition text, and the controller displays the character recognition text on the display device; and wherein when the plurality of captured images comprise the character image, the controller performs an emotion recognition process on the character image through the artificial intelligence process, to provide an emotion image corresponding to the character image to be displayed on the display device;

wherein a plurality of sticker images are provided by the controller, at least one of the plurality of sticker images selected by the controller to be provided on the character image to form an integrated character image and the integrated character image are provided by the controller on the display device;

wherein the controller displays the character recognition text, the character image and the emotion image on one side of the display device, and the character recognition text is disposed on one side of the character image.

2. The interactive wearable electronic device according to claim 1, further comprising:

a battery cell, electrically connected to the controller and configured to provide electric energy;

a communication circuit, electrically connected to the controller;

a storage circuit, electrically connected to the controller; and a loudspeaker, electrically connected to the controller;

wherein the storage circuit comprises an image database configured to store a plurality of acquaintance images.

3. The interactive wearable electronic device according to claim 1, wherein the controller provides a character audio according to the character image and adds the character audio into the integrated character image.

4. The interactive wearable electronic device according to claim 3, wherein the plurality of sticker images comprising an eye sticker image, an ear sticker image, a nose sticker image, a beard sticker image, or a body part image.

5. The interactive wearable electronic device according to claim 4, wherein the user uses a hand part to point to the character image or the integrated character image, and the controller plays the character audio or the integrated character audio through the loudspeaker to notify the user.

6. The interactive wearable electronic device according to claim 5, wherein the communication circuit is a wireless communication unit connected to a server or a mobile device.

7. An interactive wearable electronic device processing method, suitable for an interactive wearable electronic device, wherein the interactive wearable electronic device comprises a controller, a display device and an image capture device, the interactive wearable electronic device processing method comprising the following steps:

using the image capture device to capture a captured image, and detecting, by the controller, whether there is a character image among the captured image through an artificial intelligence process, and when the captured image comprises the character image, performing, by the controller, a character image recognition process on the character image through the artificial intelligence process;

performing, by the controller, a face recognition process on the character image through the artificial intelligence process for character recognition to generate a character recognition text; and performing, by the controller, an emotion recognition process on the character image through the artificial intelligence process to generate an emotion image corresponding to the character image, and displaying, by the controller, the emotion image, the character image and the character recognition text on the display device;

wherein the controller provides a plurality of sticker images, the user selects one of the plurality of sticker images to be provided on the character image to form an integrated character image;

wherein the character recognition text, the character image and the emotion image are displayed on one side of the display device, and the character recognition text is disposed on one side of the character image.

8. The interactive wearable electronic device processing method according to claim 7, further comprising the following steps:

capturing, by the controller, a face image of a user through the artificial intelligence process, together with the character image and the emotion image in a same time interval for analysis, to generate an interactive state information.

* * * * *